Figure 1:
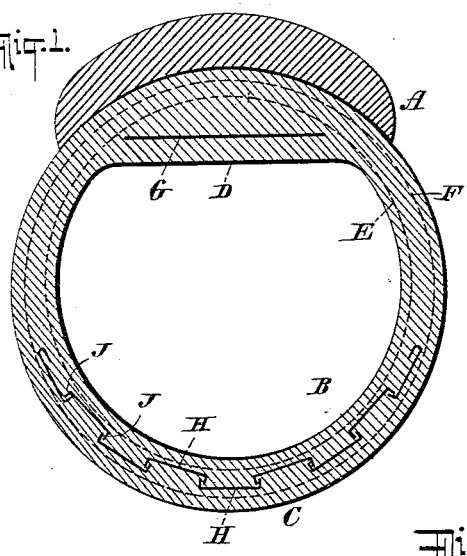

(No Model.) 2 Sheets—Sheet 1.

G. VAN WAGENEN.
PNEUMATIC TIRE FOR BICYCLES.

No. 559,987. Patented May 12, 1896.

WITNESSES:
Gustave Dieterich
John Kehlenbeck

INVENTOR
George Van Wagenen,
BY Chas. E. Gill
ATTORNEY.

(No Model.) 2 Sheets—Sheet 2.
G. VAN WAGENEN.
PNEUMATIC TIRE FOR BICYCLES.
No. 559,987. Patented May 12, 1896.
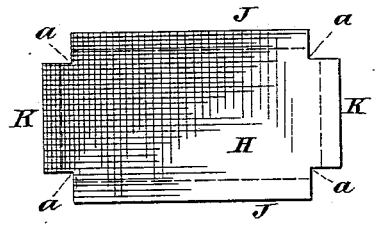
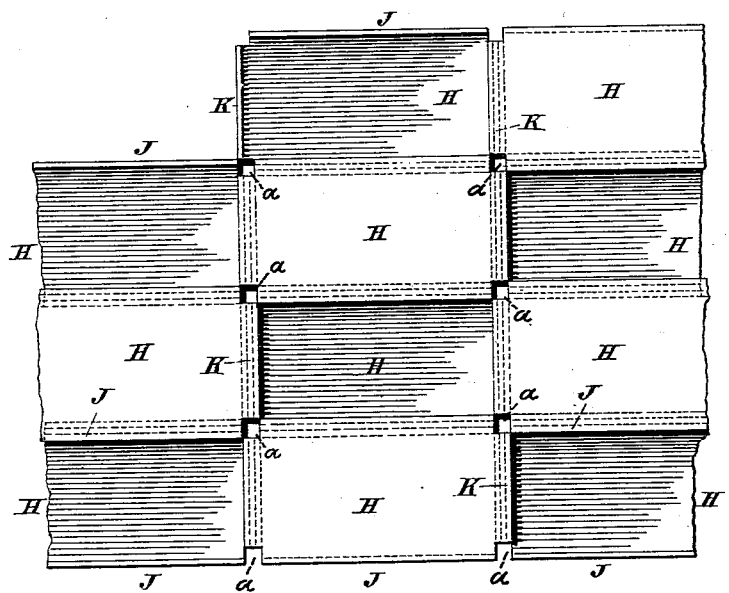
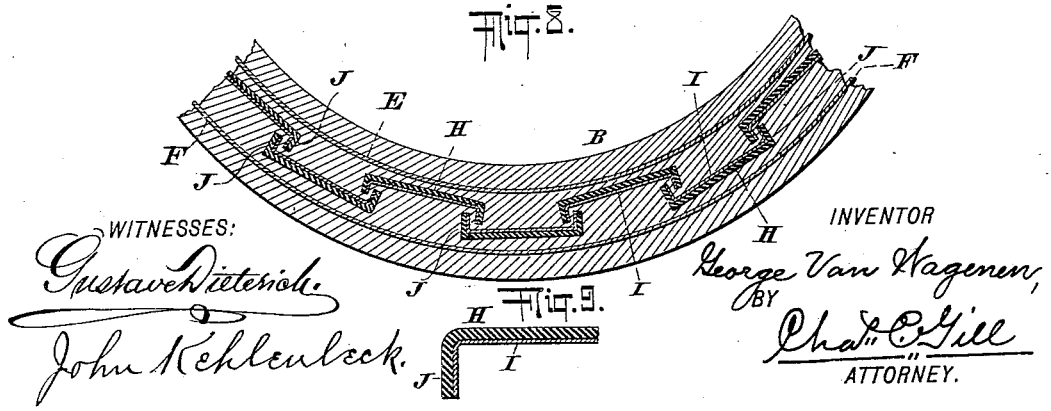

UNITED STATES PATENT OFFICE.

GEORGE VAN WAGENEN, OF NEW YORK, N. Y., ASSIGNOR TO ETHELINDA VAN WAGENEN, OF SAME PLACE.

PNEUMATIC TIRE FOR BICYCLES.

SPECIFICATION forming part of Letters Patent No. 559,987, dated May 12, 1896.

Application filed August 13, 1894. Serial No. 520,168. (No model.) Patented in England April 16, 1895, No. 7,634.

*To all whom it may concern:*

Be it known that I, GEORGE VAN WAGENEN, a citizen of the United States, and a resident of New York, in the county of New York and State of New York, have invented certain new and useful Improvements in Pneumatic Tires for Bicycles, (for which I have obtained British Letters Patent No. 7,634, dated April 16, 1895,) of which the following is a specification.

The invention relates to improvements in pneumatic tires for the wheels of vehicles, and its object is, first, to produce a pneumatic tire which will resist puncturing on its tread, and, second, to afford means of preventing the tire from pulling away from the concave rim of the wheel during the use of the tire.

In carrying my invention into effect I provide within the tread of the tire a series of longitudinally and transversely arranged independent plates whose side and end edges overlap each other, and which are adapted to yield with the rubber both laterally and longitudinally, the said plates being independent of each other and preferably inclosed between layers of canvas, which also will be embedded within the rubber of the tire. The series of plates above referred to constitute an interior lining extending transversely and longitudinally along the tread of the tire and prevent the latter being punctured by its contact with sharp objects, while at the same time the said lining is of such nature that it yields readily with the rubber of the tire and does not deaden the wheel or detract from the efficiency of the pneumatic cushion.

The second part of my invention pertains particularly to means for preventing the inner circumferential surfaces of the tire from pulling away from the concave surface of the rim of the wheel, and in carrying this part of my invention into effect I construct that portion of the tire which is in contact with the rim of plano-convex form and provide adjacent to the flat surface thereof a series of independent metallic plates, which may or may not overlap each other at their ends and extend around the tire, the object of the plano-convex portion of the tire being to cause all of the yielding motion of the tire to take place at a point outside of the opposite edges of the rim of the wheel, while the said plates located in said portion of the tire operate to stiffen the structure adjacent to the tire and prevent the drawing outward of the rubber from said rim. In accordance with the second part of my invention, when the tire is under pressure and flattened on its tread the sides of the tire will distend outward and readily yield, but the inner circumferential surfaces of the tire will be made to retain their close contact with the concave surface of the rim. Thus the yielding motion of the tire is confined to points below the opposite side edges of the rim of the wheel.

The invention made the subject of this application admits of the entire disuse of the exterior shoe or covering commonly employed to inclose the pneumatic tube of bicycle-tires, and hence the tire made in accordance with my invention may consist merely of the pneumatic tube and the rim of the wheel which receives it.

The invention will be more fully understood from the detailed description hereinafter presented, taken in connection with the claims and the accompanying drawings, which form a part of this application, and in which—

Figure 2:
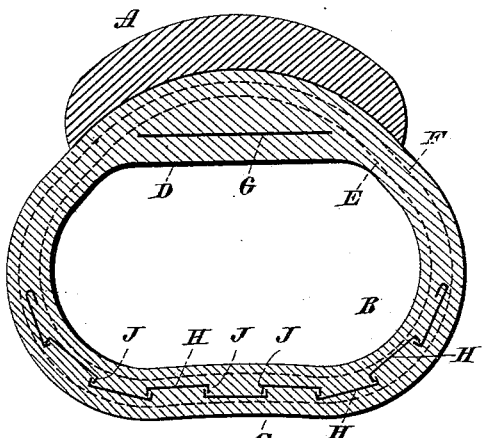
Figure 3:
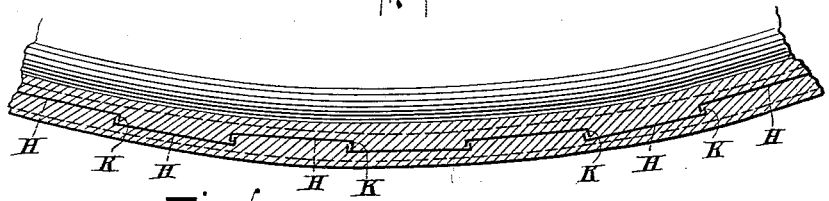
Figure 4:
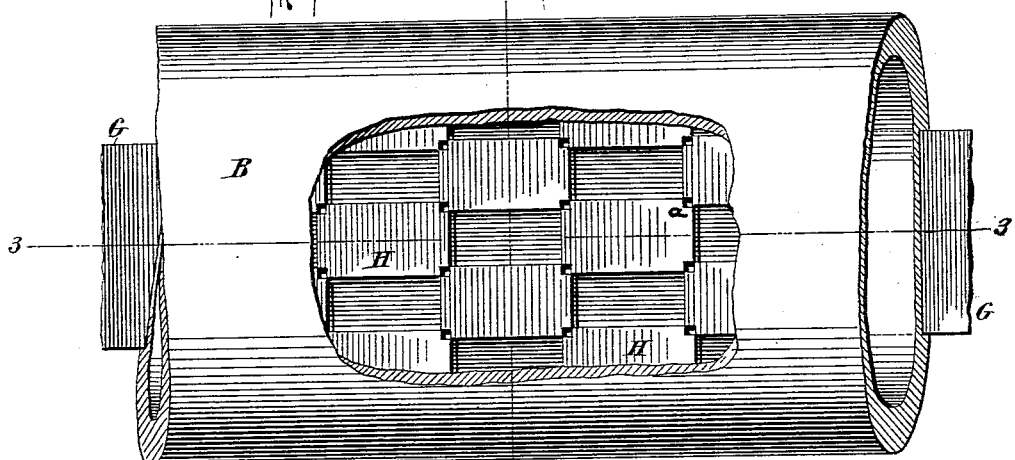

Figure 1 is a vertical transverse section through the rim and tire of a wheel constructed in accordance with and embodying the invention, the tire being illustrated in its circular or normal condition. Fig. 2 is a like view of same, illustrating the tire in its compressed condition or in the position it will assume when under pressure and passing over a surface which may bear more firmly against the central longitudinal line of the tread of the tire. Fig. 3 is a detached longitudinal section through the lower or outer portion of the pneumatic tire and illustrating the position of the series of interior plates when considered along one of their longitudinal lines. Fig. 4 is a detached view, partly broken away, of a portion of the pneumatic tire separated from the rim and illustrating the arrangement and location of the series of metallic plates constituting the lining for the tread of the wheel and showing also projecting ends of the plates, which are embedded in the plano-convex portion of the tire, which is held against the concave periphery of the rim.

Figure 5:
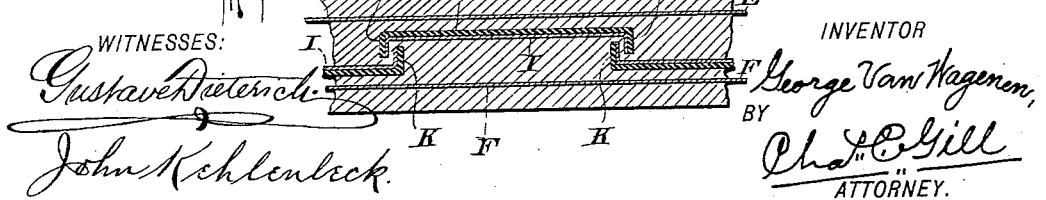

Fig. 4 indicates also by dotted lines 1 1 and 3 3 the sections on which Figs. 1 and 3 are taken. Fig. 5 is an enlarged detached longitudinal section of a portion of the tread of the tire and illustrating on an enlarged scale the relative positions of the lining-plates with respect to each other and the layers of canvas between which they are located. Fig. 6 is a detached plan view of one of the lining-plates, showing its form before its side and end edges are bent outward from the main body of the plate. Fig. 7 is an enlarged detached view, partly broken away, of a portion of the lining-plates removed from the tire and illustrating their form and relative arrangement with respect to each other. Fig. 8 is an enlarged detached vertical transverse section through a portion of the tread of the tire and illustrating on an enlarged scale the location and arrangement of the lining-plates viewed on a transverse line around the tread. Fig. 9 is an enlarged detached transverse section through a portion of one of the lining-plates and illustrating the interior canvas lining thereof and the form of the angular edges of said plates.

In the accompanying drawings, A designates the rim of the wheel; B, the pneumatic tire; C, the tread of said tire; D, the plano-convex portion of said tire in contact with the concave periphery of the rim; E F, respectively, the layers of canvas, which are embedded within the tire; G, the series of plates, which are inclosed within the plano-convex portion D of the tire; H, each of the series of lining-plates, which overlap each other at their side and end edges and extend transversely and longitudinally along the tread C; I, a lining of canvas closely fitting the interior surface of each plate H; J J, the side flanges formed on said plates H, and K K the end flanges formed on each of said plates H.

The plates H correspond with each other and extend transversely around and longitudinally along the tread of the tire on transverse and longitudinal lines, and said plates independently yield with the rubber both transversely around the tread and in line with the length of the tread. The plates H are independently yielding, but do not of themselves bend. As plainly indicated in the drawings, the flanges J K at the sides and ends, respectively, of the plates H overlap each other in transverse and longitudinal series, but are not hooked together to form a rigid chain of plates. On the contrary, as more clearly indicated in Figs. 5 and 6, the said plates at their flanges J K are separated from each other and the space between them is filled in with the rubber of which the tire is composed. In the formation of the plates H a blank having its corners removed, as indicated in Fig. 6, is first constructed and thereafter the side and end edges of said blank are turned outward at the points indicated by dotted lines in Fig. 6 to form the flanges J K and leave the reëntrant angular spaces $a$, which when the plates H are arranged in series, as illustrated in Fig. 7, admit of said plates having a due longitudinal and transverse movement under the expansion and contraction of the rubber of which the tire is formed. The size or extent of the angular spaces $a$ at the corners of the plates H will be governed by the extent of the contraction and expansion of the tire and the yielding of the plates it may be desired to permit.

The present invention is not confined to the use of the plates having angular spaces $a$, since said plates, while still having the side and end flanges and overlapping each other at their sides and ends, may be separated by a sufficient body of the rubber between them—that is, between the upper lines of plates, whose flanges point downward, and the lower lines of plates, whose flanges point upward—to avoid any necessity for the use of the angular spaces $a$.

The plates H when arranged in the transverse and longitudinal series of lines, as indicated in the drawings, will independently yield with the rubber either during the expansion or contraction of the tire or its compression while in use, as indicated in Fig. 2, and said plates constitute a non-puncturable interior lining for the tire, which will increase its durability and preserve in the tire its life without detracting from the niceties and efficiency of the pneumatic cushion. It will be observed that the plates H extend on transverse lines around the tread and on longitudinal lines along the tread, the ends and sides of the plates being on these lines, whereby the yielding lines are along the ends and sides of the plates. The flanges J K at the sides and ends of each plate are all on one side of the body of the plate, so that all of the flanges on the upper lines of the plates point downward and all of the flanges on the lower lines of the plates point upward. The flanges J K may vary in size and inclination and are important in that they effectually prevent the entrance to the tube of a tack or other small sharp object which in the absence of the said flanges might slip between the plates H and puncture the tube.

Within the tire B are the layers of canvas E F, which substantially form concentric rings and between which are arranged the longitudinal and transverse series of plates H, as illustrated in Figs. 1 and 8, the said layers of canvas increasing the strength and durability of the tire.

Within each of the plates H and conforming to the surfaces thereof is the layer of canvas I, as illustrated in Figs. 5 and 9 more clearly. The pieces of canvas I will themselves contain rubber and be placed within the plates H while that rubber is in a soft condition suitable to cause the canvas to adhere to the plate. The object of the pieces of canvas I is to prevent under any and all conditions the metallic surfaces of the plates H adjacent to their side and end edges from ever coming into contact with one another.

The plano-convex portion D of the tire is illustrated in Figs. 1 and 2, and, as above described, said portion of the tire is in contact with the concave periphery of the rim A and contains in line with its length the metallic plates G, which have no yielding action on transverse lines, but which stiffen said plano-convex portion D of the tire and prevent the surface of the same from being pulled away from the surface of the rim while the wheel is in use and under pressure. In the absence of the plano-convex portion D, the tire, when under pressure, with its sides distended, would have a natural tendency to pull the inner circumferential surfaces of the tire away from the rim A, and to overcome this tendency of the strain created by the compression of the tire and to compel the latter to closely hug the rim A is the purpose of the plano-convex portion D and plates G.

What I claim as my invention, and desire to secure by Letters Patent, is—

1. A pneumatic tire for a wheel, said tire having molded within its elastic tread the interior lining of independent plates separated from each other by the rubber of the tire and overlapping one another at their side and end edges, and each having at its sides and ends the flanges all of which project from one surface only of the plate, the said plates being arranged on the series of transverse and longitudinal lines and adapted to yield with the rubber of the tire; substantially as set forth.

2. A pneumatic tire having at its inner circumferential edges a solid plano-convex section fitting the concave rim of the wheel and containing in line with its length the series of longitudinal plates, substantially as and for the purposes set forth.

Signed at New York, in the county of New York and State of New York, this 11th day of August, A. D. 1894.

GEORGE VAN WAGENEN.

Witnesses:
CHAS. C. GILL,
ED. D. MILLER.